UNITED STATES PATENT OFFICE.

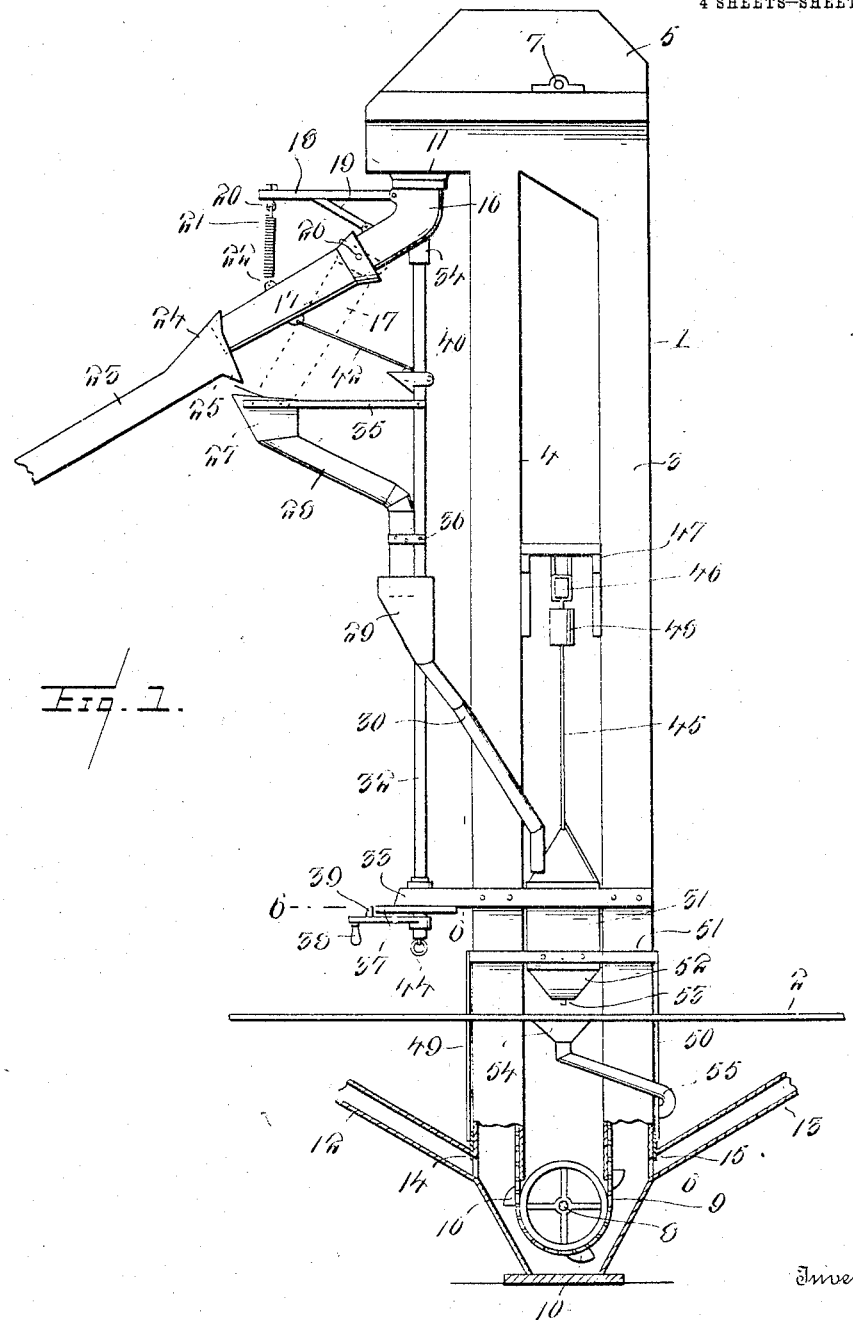

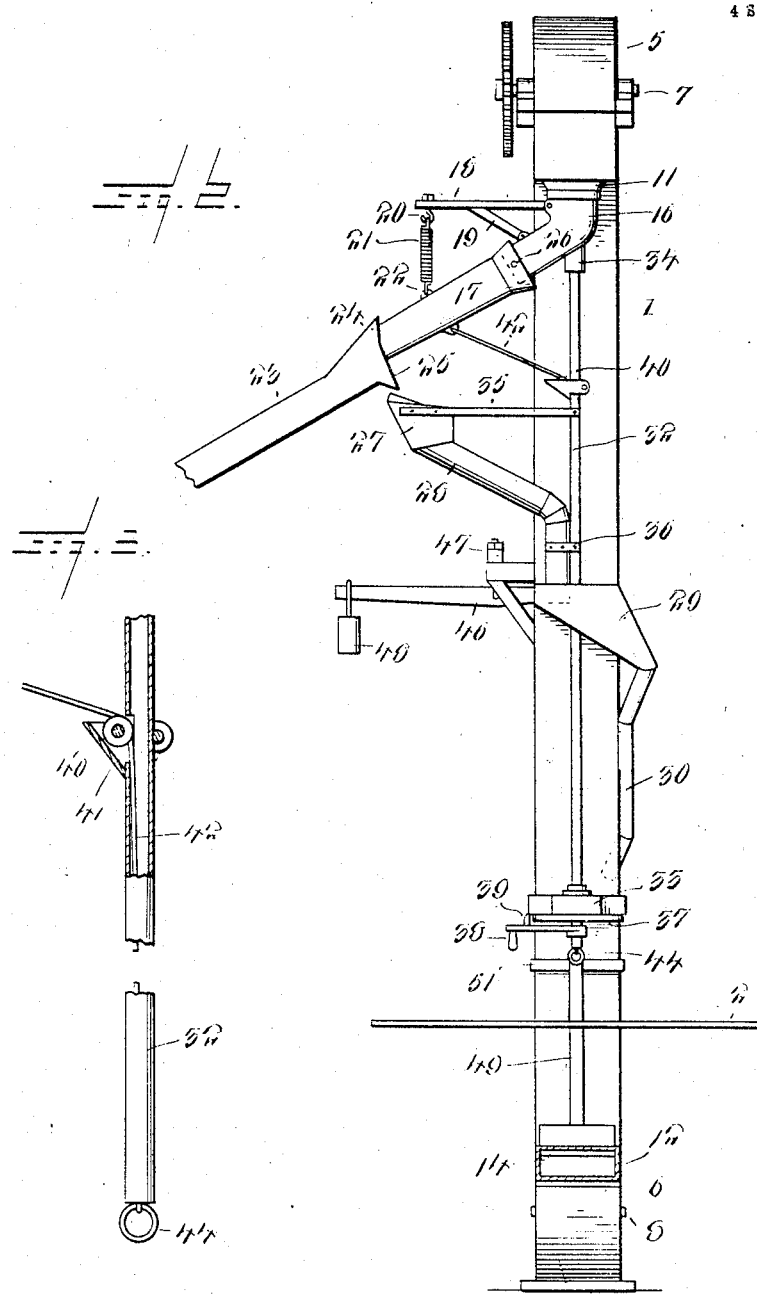

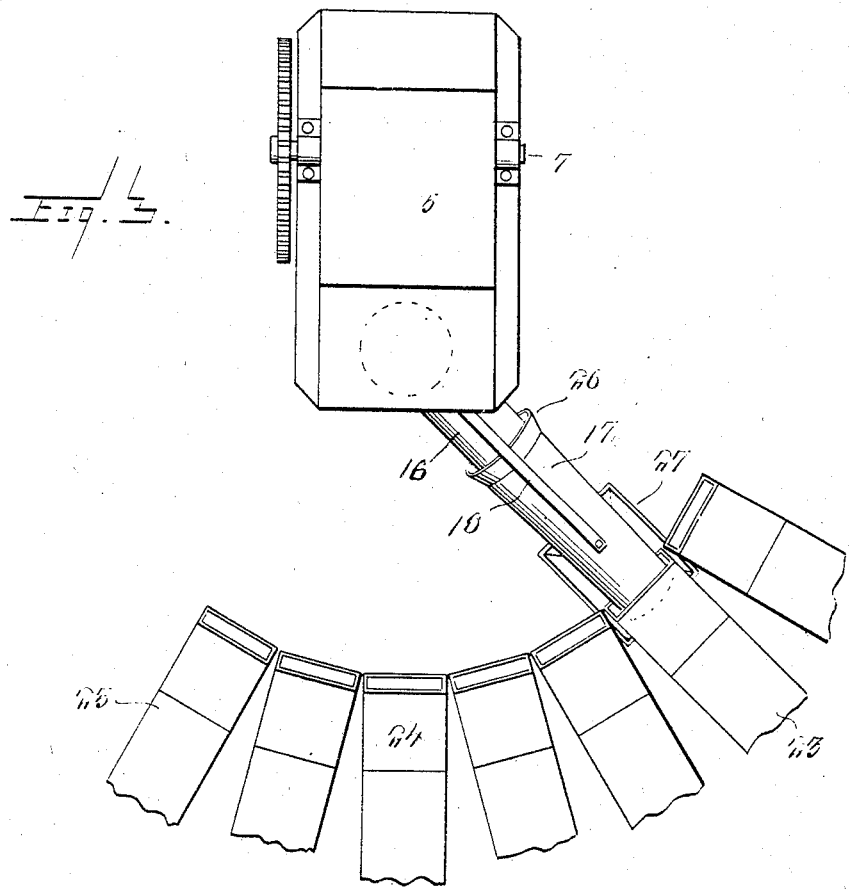
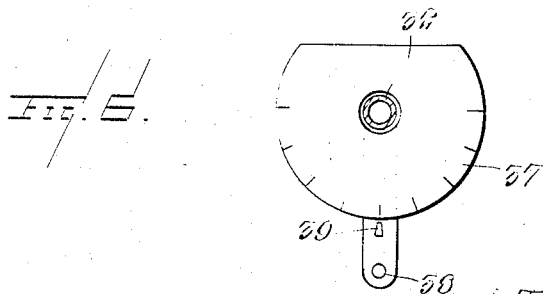

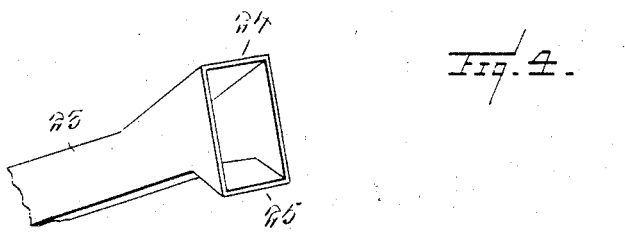
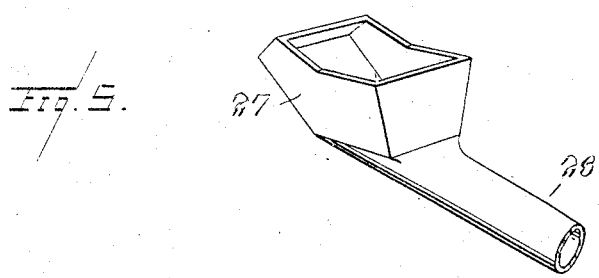
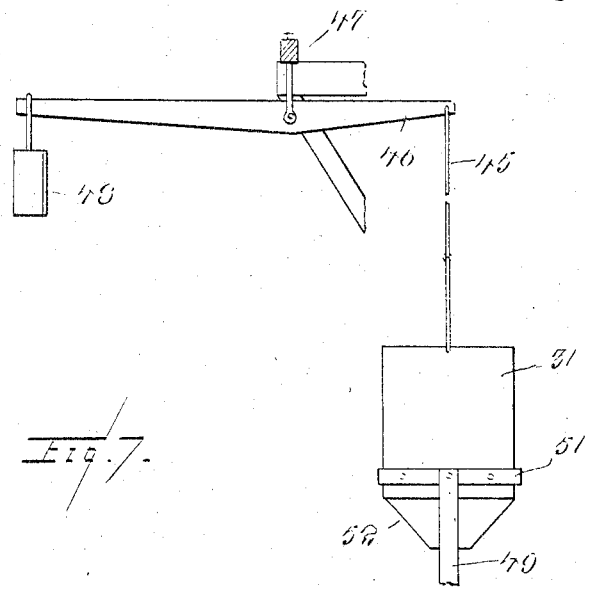

THOMAS C. LORENZEN, OF UPLAND, NEBRASKA.

GRAIN-ELEVATOR.

1,005,049.  Specification of Letters Patent.  Patented Oct. 3, 1911.

Application filed March 25, 1911. Serial No. 616,846.

*To all whom it may concern:*

Be it known that I, THOMAS C. LORENZEN, a citizen of the United States, residing at Upland, in the county of Franklin and State of Nebraska, have invented new and useful Improvements in Grain-Elevators, of which the following is a specification.

This invention relates to improvements in grain elevators and is particularly directed to means whereby the grain directed from the elevator to a bin will, when the said bin has been filled, deliver the grain to an overflow hopper which automatically closes the chutes from both the back pit and from the dump.

Another object of the invention is to provide means whereby the overflow of grain within the hopper may be readily returned to the elevator without passing through the pit or dump.

A still further object of the invention is the provision of means whereby the outlet spout may be easily and quickly positioned within any number of bonnets connected with the stationary spouts of any number of bins.

A still further object of the invention is the provision of lips upon the bonnets of the spouts leading to the bins, the said lips overlying the hopper of the return or overflow spout, so that after the said bin has been filled, the pivoted outlet spout will automatically communicate with the hopper of the overflow spout without necessitating the loss of grain.

With the above and other objects in view which will appear as the nature of the description progresses, the invention resides in the novel construction and combination of parts hereinafter fully described and claimed.

In the accompanying drawings, there has been illustrated a simple and approved device constructed in accordance with the present invention, it being understood, however, that the showing therein is merely illustrative and that minor details of construction within the scope of the claims hereinafter appended may be made if desired.

In the drawings, Figure 1 is a side elevation of a device constructed in accordance with the present invention and showing the same upon a grain elevator, parts being broken away and other parts being shown in section. Fig. 2 is an end elevation of the same. Fig. 3 is a top plan view of the device. Fig. 4 is a detail perspective view of the bonnet for the bins. Fig. 5 is a similar view of the hopper for the overflow tank. Fig. 6 is a sectional view upon the line 6—6 of Fig. 1. Fig. 7 is a detail of the overflow hopper and the weighted beam connected therewith. Fig. 8 is a side elevation partly in section of the turn pike and the chain or cable which passes therethrough.

In the accompanying drawings, the numeral 1 designates a grain elevator and 2 the working floor of the mill.

The elevator 1 is of the ordinary construction comprising the front leg 3, back leg 4, head 5 and boot 6. Both the head 5 and boot 6 are provided with transversely arranged shafts 7 and 8, the same being arranged intermediate of the legs of the device. These shafts 7 and 8 are adapted for the reception of suitable sprocket or other wheels upon which is positioned an endless conveyer belt or chain 9. The member 9 is adapted for the reception of a plurality of spaced cups 10 whereby the grain may be elevated from the boot of the device to the head thereof and delivered through an outlet 11. The boot, as in the ordinary construction of such devices, is positioned a suitable distance below the working floor 2 and communicating with the said boot is a chute 12 which serves as a delivery from the back pit. The opposite end of the boot is provided with a similar chute 13, the latter forming a communication between the elevator and the dump. Each of these chutes is normally closed through the medium of valves 14 and 15, in a manner which will presently be set forth.

Secured for rotation upon the outlet 11 is a turn head 16, and pivotally connected with the said turn-head at its outer extremity is an outlet spout 17. The turn-head 16 is pivotally provided with a horizontally extending arm 18, and also pivotally connected with the said turn-head 16 is a brace member 19, the latter being connected with the member 18. The outer extremity of the member 18 is provided with a hook 20 and connected with the said hook is a helical spring 21, the lower extremity of which being secured within an eye 22 provided upon the outlet spout 17. By reference to the figures of the drawing it will be noted that the upper end of the outlet spout 17 is flared or enlarged so that the same may be swung downwardly to the position indicated by the dotted lines in Fig. 1 of the drawings in a manner which will presently be described.

The numerals 23 designate the spouts which communicate with the bins, not shown. The outer extremity of each of the spouts 23 is formed with a bonnet 24. This bonnet 24 is of a size sufficient to snugly engage the extremity of the spout 17 when the latter is in the position illustrated in full lines in Fig. 1 of the drawings. The lower extremity of the bonnet is formed with a lip 25, the latter being positioned directly opposite the upper portion of the bonnet which is engaged through the medium of the resilient element 21 with the free end of the spout 17. The pivots 26 of the spout 17 are arranged diametrically opposite each other and it will be noted that the said spout is free to swing away from the bonnet 24 contacting the lip thereof. (See dotted lines, Fig. 1).

Positioned directly below the downturned lip 25 of the bonnet 24 is a hopper 27. This hopper is provided with an offset spout 28 and the said spout communicates with what I term a receiver 29. The receiver is provided with an outlet tube 30 and the said tube is positioned directly above an overflow hopper 31.

The numeral 32 designates what I term a turn pipe. This pipe has its lower extremity mounted for rotation within a beam 33 and its upper extremity mounted in a collar 34 provided upon the turn head 16. The beam 33 is preferably connected with the legs of the elevator and the turn pipe 32 is provided with supporting straps 35 and 36 whereby the hopper 27 and the overflow spout 28 is securely connected thereto. The under face of the beam 33 is formed with an indicating board 37 and the said board has its indicating marks designating the different bins with which the spout 17 is adapted to communicate, as will presently be apparent. The lower extremity of the pipe 32 is provided with an offset handle 38, and the said handle is formed with a suitable indicating finger 39 which is adapted to register with any of the indicating marks upon the indicating board 37, so that the grain from the spout 17 will be directed to the bin bearing a corresponding mark.

The numeral 40 indicates a sheave wheel which is pivotally connected in any desired manner to the turn pipe 32, and the said pipe is provided with an opening 41 adjacent the said wheel 40 whereby a chain or cable 42 engaging the said sheave may pass through the pipe 32. One end of this element 42 is connected with the under face of the spout 17 as at 43 and the lower end of the said flexible element 42 is connected with the ring 44. The ring is of a larger area than the thickness of the pipe 32 and the said ring serves a two-fold purpose, that of limiting the movement of the spout 17 against the resilient element 21 and also for retaining the spout in proper position directly above the hopper 27 until all the grain delivered thereto from the elevator is received by the said hopper.

Secured to the overflow hopper 31 is a supporting rod 45. The upper extremity of the said supporting rod is connected with a beam 46, and the said beam is pivotally connected with suitable supports 47 provided between the legs 3 and 4. The beam 46 is adapted for the reception of a weight 48, the same adapted to compensate for the weight of the hopper 31 to retain the same in a normal elevated position.

The valves 14 and 15 are provided with vertically extending members 49 and 50, and these members are connected through the medium of a transverse member 51 with the overflow hopper 31. The lower extremity of the hopper 31 is substantially cone-shaped as at 52 and the open mouth thereof is normally closed through the medium of a slide valve 53. Positioned directly below the cone-shaped extremity 52 of the hopper 31 and preferably secured to the working floor 3, is a funnel-shaped member 54, the latter having its lower open portion provided with an offset pipe 55, and the said pipe is adapted to communicate with the front leg 3 directly above the chute 13 which communicates with the dump.

Briefly stated, the operation of the device is as follows: It is, of course, to be understood that either of the shafts 7 or 8 are provided with means whereby the endless conveyer is operated, and the grain from either of the chutes 12 or 13 which is fed within the boot of the elevator is gathered up by the cups 10 and delivered to the elevator head and from thence through the outlet 11 to the turn-head 16. The grain is, of course, conveyed by the spout 17 to the spout 23 which communicates with the bin. It will be noted by reference to the drawings that the spout is effectively retained in proper position within the bonnet 24 of the spout 23 through the medium of the spring 21, and furthermore that the lip 25 of the said bonnet overlies the hopper 27. When the spout 23 is filled the extra or surplus delivery of grain will feed to the hopper 27. The grain thus delivered is conveyed through the spout 28 and tube 30 to the overflow hopper 31. When sufficient grain has been received within the said hopper 31 to overcome the balance of the weight 48, the said hopper will descend, causing the valves 14 and 15 to close the chutes 12 and 13 and thus prevent the entrance of additional grain to the boot of the elevator. The grain from the hopper 31 is allowed, upon operation of the valve 53, to enter the elevator above the chutes 12 and 13, and is consequently raised by the cups 10 before reaching the boot. The operator, being aware that the first bin is filled, turns the pipe 32 through the medium of the handle 38 to the next bin, the spout being lowered through the medium of the flexible element 42 and the ring 44 connected therewith and the surplus grain within the spout will be again delivered to the hopper 27. When the spout is in communication with the proper bonnet, pressure upon the ring 44 is released and the spout 17 will, through the medium of the spring 21, automatically engage with the said bonnet. The hopper 31, being relieved of its pressure, will, through the medium of the weight 48, assume its normal position and consequently raise the valves 14 and 15 to allow additional grain to enter the boot 6 of the elevator. This process is repeated until all of the bins are filled and it will be noted that danger of mixing several kinds of grain within a single bin is thus effectively overcome.

Having thus fully described the invention, what I claim as new, is:—

1. The combination of a grain elevator, a delivery spout connected with the elevator, a spout communicating with the bin, said spout having its outer extremity formed with a bonnet, the upper portion of which being adapted to receive the spout from the elevator, the lower portion of the bonnet being provided with a depending inclined lip, and a hopper positioned directly below said lip.

2. The combination of a grain elevator having inlet valves, an outlet spout connected with the elevator, a grain supply pipe, said pipe having its extremity provided with a bonnet adapted to be contacted by the outlet pipe, the lower extremity of the bonnet being provided with a lip, a hopper being positioned below said lip, a slidable member communicating with the hopper, and a connection between the sliding member and the inlet valves, substantially as described.

3. The combination of a grain elevator, a pivoted outlet spout for said elevator, inlet chutes for the elevator, valves for said inlet chutes, and means comprising an overflow of grain and means operative thereby for returning the grain to the elevator above the inlet chutes and to close the valves for said chutes.

4. The combination with a grain elevator, said elevator having its head provided with a rotatable member, of an outlet spout pivotally connected with the said rotatable member, means provided upon the rotatable member for sustaining the spout in one position, an inlet chute for the elevator, a valve for said chute and means comprising an overflow of grain and means actuated thereby to return the grain to the elevator above the inlet openings of the elevator.

5. The combination of a grain elevator, having a boot, oppositely arranged legs and a head communicating with the legs, an endless conveyer within the elevator, the head of said elevator being formed with an outlet member, a turn-head connected with the outlet member, a spout having a flaring end and pivotally connected with the turn-head, means provided upon the turn-head for resiliently supporting the outlet spout, inlet chutes for the boot of the elevator, valves for said chutes, and return pipes connected with the elevator above the inlet chutes thereof.

6. In a device for the purpose set forth, a grain elevator, a pivoted outlet spout for said elevator, automatic means for sustaining the outlet spout in one position, return pipes communicating with the elevator, and means for swinging the outlet spout into communication with the return pipes.

7. The combination of a grain elevator having inlet chutes and valves for said chutes, a movable hopper connected with the valves, means connected with the hopper for normally sustaining the valves in an open position, a return pipe connected with the elevator and positioned directly below the hopper, a swinging outlet pipe for the elevator, and means comprising an overflow of grain to cause the surplus of grain to flow within the hopper to lower the same and the valves connected therewith to close the inlet chutes.

8. In combination of a grain elevator having its outlet provided with a turn head, an outlet spout pivotally connected with said head, means provided upon the outlet spout for resiliently forcing the said spout upwardly, means comprising a bonnet connected with the bin spouts for limiting the upward movement of the said spout, means for swinging the spout downwardly and out of contact with the bonnet and means for rotating the spout.

9. The combination with a grain elevator and a plurality of grain bins, each of said bins having spouts, of bonnets upon the ends of said spouts, each of said bonnets having their lower portions provided with a lip, a pivoted outlet spout connected with the elevator, resilient means for forcing the free end of the spout into engagement with the upper ends of one of the bonnets, means for swinging the spout out of engagement with one of the bonnets, means for rotating the spout to allow the same to engage with the bonnet of a second bin, and an indicator for registering the number of bin with which the spout engages.

10. The combination with a grain elevator provided with front and back legs, of a plurality of receiving bins, each of the said bins having spouts provided with bonnets, each of the said bonnets being flared upwardly to provide an enlarged mouth, the lower extremity of each of the bonnets being formed with a downwardly extending lip, a rotatable hinged outlet spout for the elevator, resilient means for forcing the outlet mouth of the spout into contact with the upper inclined portion of the bonnet, a hopper provided with a spout and arranged directly below the lip of the bonnet, a tube communicating with the spout, a balance receiving hopper arranged between the legs of the elevator and communicating with the tube, a funnel-shaped member provided with an outlet pipe arranged below the outlet mouth of the said hopper, the boot of the elevator being provided with chutes, valves connected with the balanced hopper and adapted to close the chutes, and the pipe of the funnel-shaped member communicating with one of the legs of the elevator directly above one of the chutes.

11. The combination with a grain elevator having front and back legs, the boot of the elevator being provided with inlet chutes, of a sliding valve for the chutes, a pipe communicating with one of the legs of the elevator above one of the inlet chutes, said pipe being provided with a funnel-shaped mouth, a slidable hopper having a cone shaped lower portion arranged directly above the funnel-shaped mouth of the pipe, a sliding valve for this hopper, a connection between this hopper and the chute valves, a rod connected with the hopper, a pivoted beam connected with the rod, a counterbalancing weight upon the beam, a turn-head connected with the outlet of the elevator, a hollow turn pipe connected with the turn head, a support for the lower portion of the turn pipe, an indicating board secured to the support, a handle having an indicating finger for the turn pipe, an outlet spout having one of its ends flared and pivotally connected at opposite sides to the turn head, a resilient element connected with the turn head and with the outlet spout for normally forcing the spout in one direction, the said outlet spout adapted to engage the bonnets of the bin spouts, a hopper positioned directly below the bonnet engaged by the outlet spout, a spout connected with the hopper, means for connecting both the hopper and spout with the turn pipe, a tube having an enlarged end positioned directly below the spout, said tube having its free end positioned directly above the slidable hopper, a flexible member connected with the outlet spout, said flexible member adapted to extend through the hollow turn pipe, and a ring member secured to the end of the flexible member, all substantially as and for the purpose set forth.

In testimony whereof I affix my signature in presence of two witnesses.

THOMAS C. LORENZEN.

Witnesses:
CHAS. BROTHERSEN,
LLOYD P. ZETTLE.